United States Patent Office 3,508,319
Patented Apr. 28, 1970

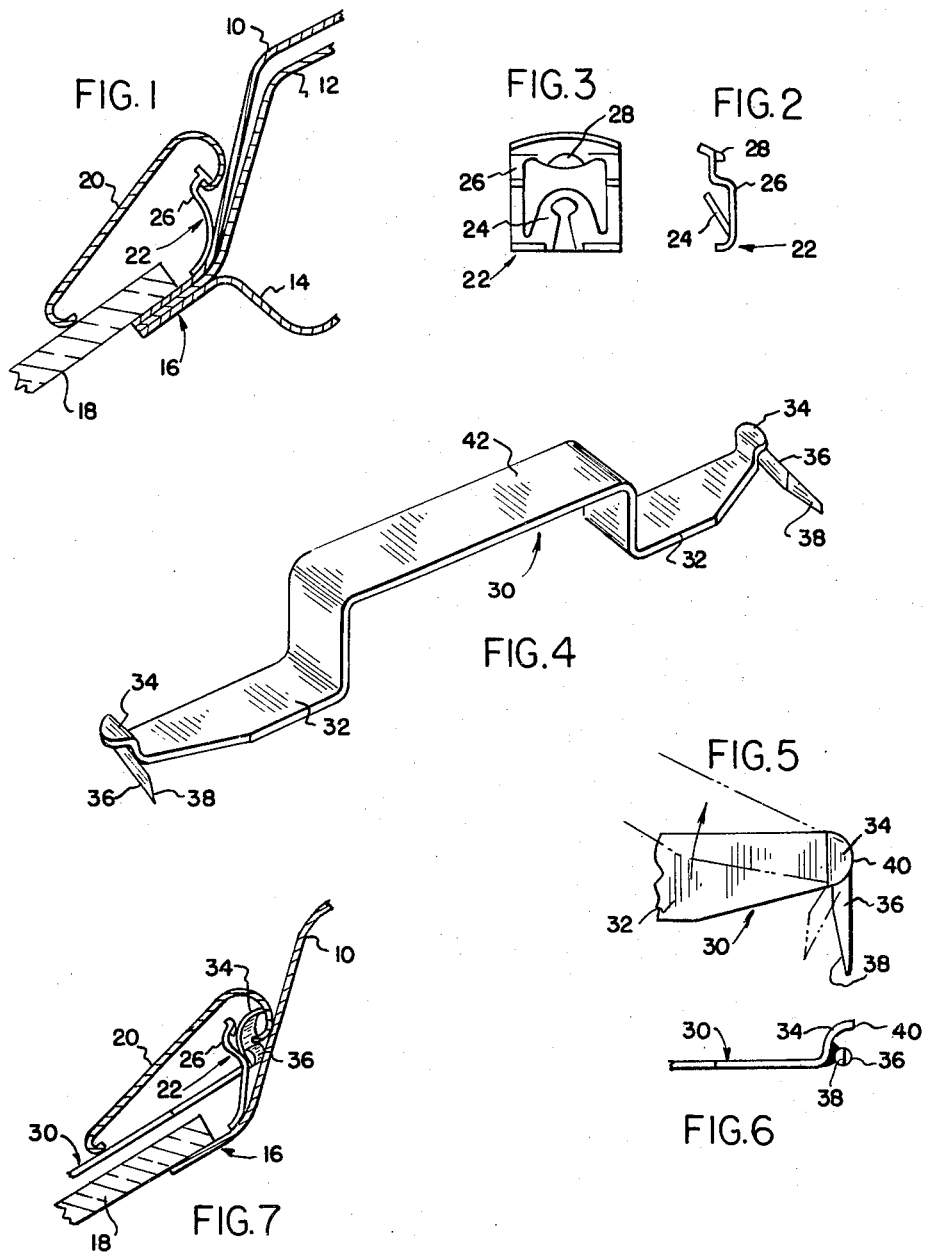

3,508,319
WINDSHIELD MOLDING REMOVAL TOOL
Ambroise O. Boyer, 1535 Holden,
Detroit, Mich. 48208
Filed Mar. 6, 1968, Ser. No. 711,142
Int. Cl. B25b 27/14
U.S. Cl. 29—235                                     1 Claim

ABSTRACT OF THE DISCLOSURE

A prying type tool is used for removing snap-on automotive windshield trim moldings. While the tool lip holds the molding in place, a prying rod on the tool engages the yieldable clip and lifts it out of engagement with the molding. This assures that neither the molding nor the clip will be damaged during such removal.

BRIEF DESCRIPTION OF THE DRAWINGS

FIG. 1 is a cross-sectional elevation taken along a longitudinal vertical plane through the automobile, showing the joint between the upper portion of the windshield and a portion of the roof panel and windshield header.

FIG. 2 is an end view of the windshield trim molding retaining clip, as shown in FIG. 1.

FIG. 3 is a front view of the clip of FIG. 2.

FIG. 4 is a perspective view of the tool of this invention.

FIG. 5 is a fragmentary plan view of one end of the tool of FIG. 4, further illustrating in phantom lines the tool in a second position following the typical prying motion.

FIG. 6 is a fragmentary view of the tool illustrated in FIG. 5.

FIG. 7 is a cross-sectional elevation similar to FIG. 1, but showing the action of the tool in releasing the molding from the retaining clip.

DETAILED DESCRIPTION OF THE INVENTION

The upper portion of a typical automobile windshield opening is illustrated in cross-section in FIG. 1. The windshield opening is framed by the assembly of the roof panel 10 and the upper and lower members of the transverse windshield header 12 and 14, respectively. The header, shown only fragmentarily, generally comprises a box section for rigidity. The roof panel and header members are welding together along their superimposed flanges at a joint known as a fence and shown at 16. A similar type of fence construction passes around the entire windshield opening, that is, along the side posts or pillars and along the cowl.

To assemble the windshield 18 to the car, adhesive is applied to the entire fence periphery, and the windshield laid in place against the adhesive-coated fence. The windshield decorative molding 20 is a rolled section having a generally C-shaped configuration in cross-section. The molding is secured to the car by a series of yieldable clips 22 more fully illustrated in FIGS. 2 and 3.

Clips 22 are provided with a central tab 24 (which has been omitted from FIGS. 1 and 7 for clarity) which receives a nail (unillustrated) which is generally electrically driven into and welded to the fence at approximately ten inch intervals. This method of construction has also been used to install moldings around the rear window of the vehicle. Clips 22 are further provided with an outer springy loop 26 which has a depressed portion 28 which acts as a latch over which the right hand flange of the molding 20 (as viewed in FIG. 1) can snap during assembly. The inherent resiliency of the molding cross-section serves to maintain the molding firmly against the windshield as shown in FIG. 1.

The improved molding removal tool of this invention is illustrated in FIGS. 4 through 6. The tool generally comprises a steel bar or strip 32 having a step-like lip 34 at each end. A rigid pyring rod 36 is firmly secured, as by welding or silver soldering, transversely under each end lip 34.

A rod of ⅛ inch diameter and extending approximately ½ inch beyond the step 34 (downward in FIG. 5) has been found most effective for releasing the windshield clips. The end lip or step 34 should have a rise of approximately ³⁄₁₆ of an inch above the main portion of bar 32, and should extend longitudinally far enough to at least cover rod 36. That is, as viewed in FIG. 6, step 34 should extend to the right at least as far as a vertical tangent projected upward from the right side of rod 36.

The inside edge of prying rod 36 is beveled, as best shown in FIG. 5. The tip of the end lip is preferably rounded at 40, as also seen in FIG. 5.

The center section of tool 30 is raised to form a gripping handle. It will be seen from FIG. 4 that the tool is asymmetrical, so that the opposite ends are a mirror image of each other.

The procedure for removing the molding 20 is generally to first insert a plastic stick between the glass and molding in order to lift the molding sufficiently that the left hand edge of it (as viewed in FIG. 1) can be gripped by one hand of the workman. With his other hand, the workman inserts one end of tool 30 under the molding, and slides it laterally until the tapered tip of prying rod 36 is engaged behind the loop portion 26 of a clip 22.

Once in place, the tool is pivoted about tip 40 of end lip 34. This is best shown in FIGS. 5 through 7. With the tool in place, tip 40 bears against the inside surface of the right flange of molding 20. It can be seen that when the tool is pivoted clockwise about tip 40 (FIG. 5), the tip of prying rod 36 moves outwardly from such bearing surface. As shown in FIG. 7 (in which the tool is oriented as in the phantom pivoted position of FIG. 5), it can be seen that this prying action lifts loop 26 of clip 22 outwardly (toward the left) while holding molding 20 to the right, so that latch 28 releases the flange of molding 20. With the workman's other hand, the molding can then be litfed away from the clip. The workman then proceeds around the periphery of the windshield, repeating the above sequence at each clip.

An important feature of this invention lies in the provision of the end lip 34. In the past, the moldings have been very frequently damaged during the removal operation because of the operator's difficulty and impatience in releasing the molding from the clip. The prying of the clip frequently did not remove latch 28 from the molding, but only served to pull the molding outwardly with it. The provision of the lip 34, as best shown in FIG. 7, permits the tool to bear against the inside edge of the molding during the prying action, so that the molding is constantly being held or pushed towards the right in FIG. 7 as the latch is pryed toward the left, thus insuring disengagement without damage to the molding. Furthermore the likelihood of permanent set or other damage to the clip is eliminated, thus assuring that the clip may be reused for re-assembly of the molding.

The asymmetric configuration of the tool permits it to be used from either side of the car according to the preference and convenience of the operator. In other words, if he prefers to work towards himself while on the driver's side of the car, he would use the right hand edge of the tool as shown in FIG. 4. Conversely, while operating on the other side of the car, he would use the left hand end of the tool.

This invention may be further developed within the scope of the following claims. Accordingly, the above specification is to be interpreted as illustrative of only a single operative embodiment of this invention, rather than in a strictly limited sense.

I now claim:
1. A tool for removing decorative moldings which surround an automotive windshield or back window wherein such moldings are retained by a plurality of spaced yieldable clips secured to a sheet metal edge of a windshield opening, one edge flange of a generally C-shaped molding cross-section snapping over the clips at assembly, said tool comprising:

a flat elongated bar sufficiently thin to enable a first end to be slipped between the partially lifted unfastened edge of the molding and windshield;

said bar having a step passing transversely across said end whereby the end of said bar has a first approximately right angle upward bend relative to the main portion of said bar to form a vertical leg approximately 3/16 inch high, and a second approximately right angle bend to form a second leg substantially parallel to said main portion of said bar and approximately 1/8 inch long;

and a rigid rod of approximately 1/8 inch diameter firmly and transversely secured to said bar at the outside edge of said first bend of said step and being long enough to extend transversely out from beneath one side of said step approximately 1/2 inch, said protruding portion of said rod being beveled to taper to a narrow tip capable of insertion behind the yieldable clip;

whereby said molding can be released by inserting said first end of said tool between the windshield and molding and successively sliding said tapered tip of said rod behind each of said clips, a tip of said end of said bar bearing against the inside face of said fastened edges of said molding and forming a fulcrum to permit said rod to pry said clip open to release said molding.

References Cited
UNITED STATES PATENTS

D. 193,069   6/1962   Woolums _____ 29—225
1,892,824   1/1933   Ziegler _____ 29—267

OTHELL M. SIMPSON, Primary Examiner

G. F. GRAFEL, Assistant Examiner

U.S. Cl. X.R.
29—267